Nov. 27, 1962  H. E. EDGERTON  3,065,667
TRANSPARENCY PHOTOGRAPHIC APPARATUS
Filed July 15, 1957  3 Sheets-Sheet 1

INVENTOR.
HAROLD E. EDGERTON
BY Rines and Rines
ATTORNEYS

Nov. 27, 1962 H. E. EDGERTON 3,065,667
TRANSPARENCY PHOTOGRAPHIC APPARATUS
Filed July 15, 1957 3 Sheets-Sheet 2

INVENTOR.
HAROLD E. EDGERTON
BY Rines and Rines
ATTORNEYS

Nov. 27, 1962 H. E. EDGERTON 3,065,667
TRANSPARENCY PHOTOGRAPHIC APPARATUS
Filed July 15, 1957 3 Sheets-Sheet 3

INVENTOR.
HAROLD E. EDGERTON
BY Rines and Rines
ATTORNEYS 3,065,667
TRANSPARENCY PHOTOGRAPHIC APPARATUS
Harold E. Edgerton, Belmont, Mass., assignor to Edgerton, Germeshausen & Grier, Inc., Boston, Mass., a corporation of Massachusetts
Filed July 15, 1957, Ser. No. 671,915
9 Claims. (Cl. 88—24)

The present invention relates to photographing apparatus, and, more particularly, to apparatus that is particularly adapted for the making of enlarged prints from transparencies.

The printing of transparencies, such as 35-millimeter color or black-and-white transparencies, has heretofore involved the use of conventional enlarging and re-photographing equipment and techniques, requiring considerable time and expense. In addition, it has required the services of a skilled photographer or operator.

An object of the present invention, however, is to provide, in preferably a single machine, apparatus that is adapted rapidly to make prints, usually enlargements, of transparencies without the time consumption, relatively high cost or skilled handling heretofore required.

A further object is to provide such an apparatus that is adapted for commercial use in photographic stores, drug stores and other similar agencies where the unskilled patron may merely insert the desired transparency and promptly obtain the enlarged print thereof. In summary, this result is obtained through the utilization of a normally ineffective source of momentary illumination, preferably of the electronic flash-producing type. A camera is provided, having a lens directed toward the source. Interposed between the source and the lens is a member for supporting the transparency. Means is provided, operable when the transparency is properly supported, for rendering the source effective to produce a momentary flash of illumination. The lens is adjusted with respect to the camera film and the transparency supporting means to focus preferably an enlargement of the illuminated transparency upon a predetermined portion of the camera film. The camera itself is preferably internally provided with means controlled by and upon the operation of a film-advancing means for developing and printing the said predetermined portion of the film exposed to the momentary illumination. Means is thereupon provided for permitting the removal of the developed and printed predetermined portion of the film from the camera with the advanced film in position for exposure to a subsequent momentary illumination.

Other and further objects will be explained hereinafter and will be more particularly pointed out in the appended claims. The invention will now be described in connection with the accompanying drawing, FIG. 1 of which is a perspective view, partly broken away, illustrating a preferred form of the apparatus of the present invention;

Figure 1:
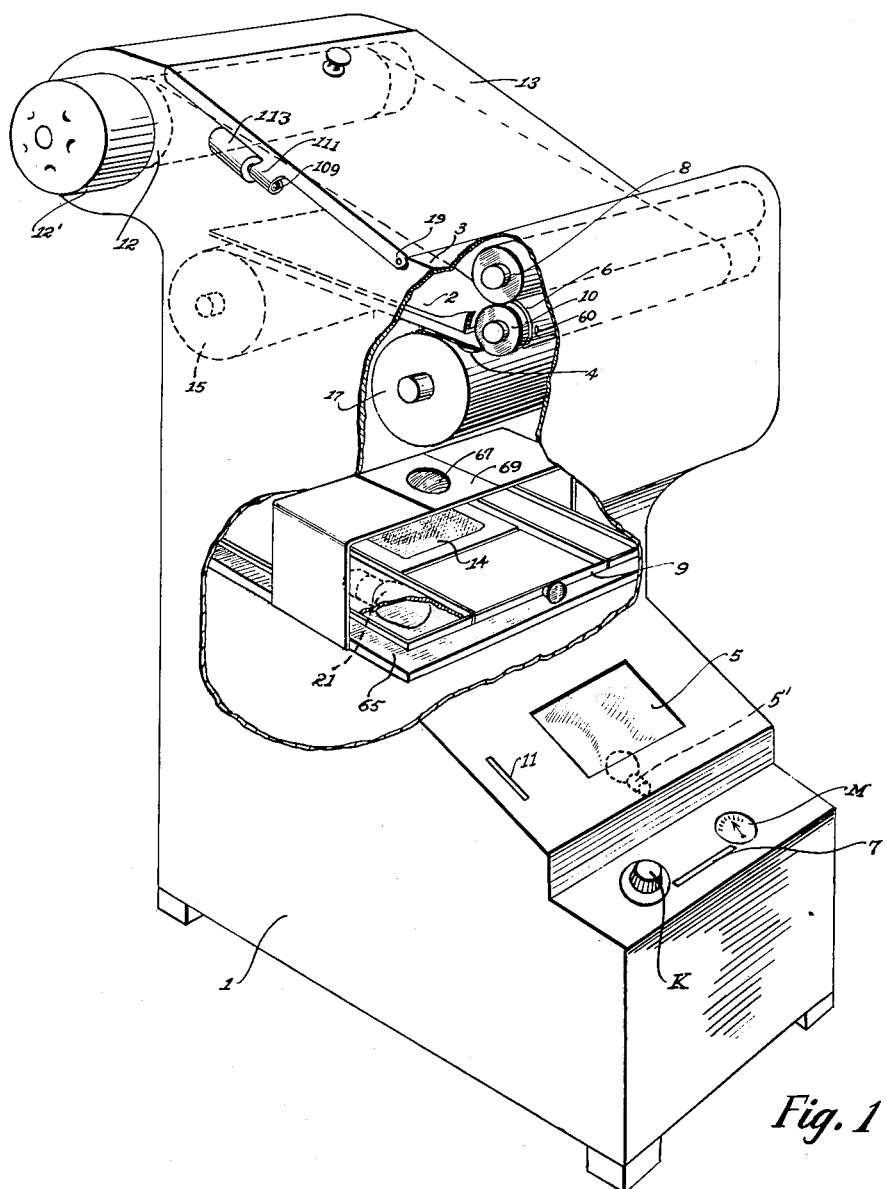

Referring to FIG. 1, a substantially light-type housing 1 is shown provided, preferably near the top thereof, with a processing head 3 which may assume the form of a self-developing type of photographic camera, such as, for example, the "Polaroid Land Camera," Model 95A. An unskilled patron or user desiring to obtain prints of transparencies, such as, for example, 35-millimeter color transparencies that he has received from a commercial developing establishment, may utilize the machine of FIG. 1 as follows. First, he may place the transparency over a translucent viewing area 5 behind which may be disposed a source of illumination, such as an ordinary light bulb 5′. The user is thus satisfied that the transparency is sufficiently good for printing. He may then insert the transparency within a slot 7 and observe a reading upon a meter M, resulting from a photo-sensitive photoelectric meter, later described, which measures the density of the transparency. By then adjusting a knob K, the user sets the intensity of the hereinafter-described light flash to a value corresponding to the measured density of the transparency. The user then mounts the transparency 14 in an aperture of a slide-support tray 9 and inserts the support 9 into the housing 1. Upon the insertion of an appropriate coin or coins within a coin slot 11, a flash of momentary light is produced within the housing 1 that passes from a normally ineffective light source 21 through the transparency 14 on the slide-support 9 and is focused by a lens 67 of the camera 3 preferably as an enlargement upon a predetermined portion of a film 2 in the processing camera head 3. After the elapse of a predetermined interval of time sufficient for an automatic developing and printing process within the processing camera head 3 to occur, the user may open the lid 13 of the camera 3, FIG. 2, and withdraw the print 6 from the apparatus. The slide 9 may then be drawn outward and a new transparency may be placed thereupon for the production of subsequent prints.

Figure 4:
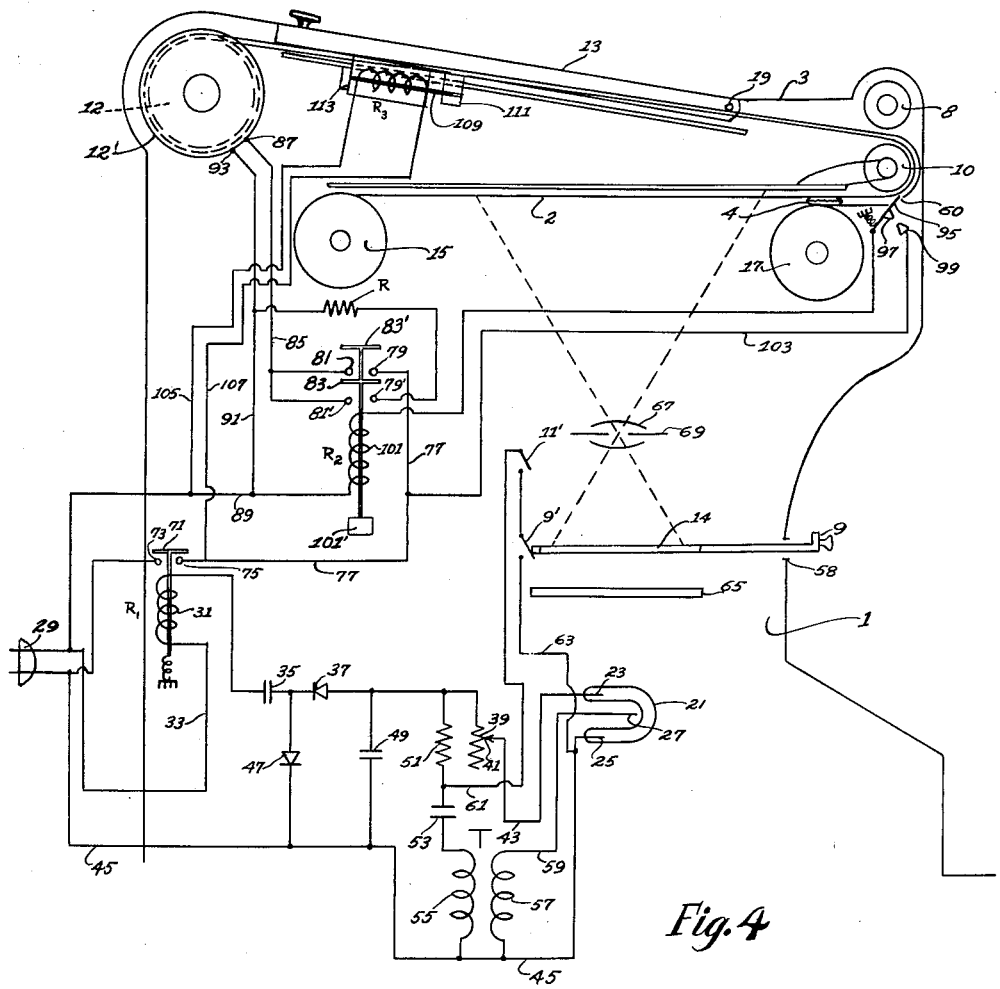

Preferred apparatus for carrying out the various functions of the equipment disposed within the housing 1 is illustrated in FIG. 4. The processing camera head 3 is there shown having a film-supply roll 15, which may be supplied from a larger supply roll in the housing, not shown, and a film developer roll 17. A film 2 extends from the supply roll 15 above the film developer roll 17, engaging a developing and printing pellet 4 secured to the film developing-paper 6 carried by the developing roll 17. The developing-roll film paper 6 is advanced together with the film 2 upward to the right of the roll 17 between a pair of squeeze rolls 8 and 10 and thence back from right to left across the processing head 3 to a delivery motor cylinder 12 at the upper left of the processing head 3. The cylinder 12 may be driven by a normally ineffective motor 12′. When the motor 12′ is rendered effective, the cylinder 12 will be rotated counter-clockwise, drawing the film 2 and the film developing and printing paper 6 together between the squeeze rolls 8 and 10 to effect the crushing of the pellet 4 and the consequent developing and printing that is well known in the before-described type of camera. As will be hereinafter described, after a predetermined interval of time, corresponding to the time it takes to advance the film so as to ready the next successive portion thereof for subsequent exposure, the motor 12′ will be rendered ineffective again stopping further film advancement. After the developing and printing time has elapsed, the lid 13 of the processing camera head 3 may be pivoted upward about a hinge 19, FIG. 2, so that the customary serrated film print 6′ may be detached from the roll 6 and withdrawn from the camera.

In accordance with a feature of the present invention, the momentary illumination may be produced by an electronic flash-producing system such as, for example, of the type disclosed in my United States Letters Patent No. 2,588,368, issued March 11, 1952. If desired, the flash device may also comprise a spark gap as disclosed, for example, in my prior United States Letters Patent No. 2,478,901 and No. 2,478,906 both issued August 16, 1949. Other types of momentary illumination-producing circuits may also be employed, though the circuit illustrated in FIG. 4 is preferred in view of its simplicity and in view of the high intensity and brief flash-illumination obtainable therewith. The source of illumination is shown comprising a flash lamp or tube 21, illustrated as of U-shape configuration, though other configurations, such as those described in the said Letters Patent, may also be employed. The tube 21 is provided with a pair of principal electrodes 23 and 25 and preferably an external trigger electrode 27. Internal trigger-electrode tubes as well as tubes embodying only the principal electrodes may also be employed, as disclosed, for example, in the United States Letters Patent No. 2,722,629, issued November 1, 1955, to Kenneth J. Germeshausen. Other types of momentary illumination sources may also be employed. The apparatus may obtain its operating voltage from a mains plug 29 that will apply, for example, alternating current by a conductor 33 through the coil 31 of a first relay device $R_1$, to a capacitor or capacitors 35. The capacitor 35 is connected in series with a rectifier 37, such as, for example, a selenium-type rectifier, and is then connected through a variable impedance 39, shown as a potentiometer, the tap 41 of which may be controlled by the knob K of FIG. 1. The tap 41 is connected by a conductor 43 to the anode or positive principal electrode 23 of the flash device 21. The other or lower conductor of the plug 29 is connected to a conductor 45 which connects to the cathode or negative principal electrode 25 of the flash device 21. Between the junction of the capacitor 35 and the rectifier 37 and the conductor 45, a further rectifier 47 is connected in shunt. Similarly, between the junction of the rectifier 37 and the potentiometer 39 and the conductor 45, a further shunt capacitor 49 is disposed. Connected in parallel with the capacitor 49 is an impedance, such as a resistor 51, connected in series circuit with a further capacitor 53 and the primary winding 55 of a trigger transformer T. The secondary winding 57 of the transformer T is preferably a step-up winding the upper terminal of which is connected by conductor 59 to the trigger electrode 27 of the flash device 21, and the lower terminal of which connects with the conductor 45.

The capacitors 35 and 49 will become charged with direct-current voltage in the following circuits. The capacitor 35 becomes charged along conductor 33, relay coil 31, capacitor 35, rectifier 47 and conductor 45. The capacitor 49 becomes charged in the circuit traceable from the conductor 33 through the relay coil 31, capacitor 35, the further rectifier 37, the capacitor 49 and conductor 45. The charged capacitor 49 thus applies its potential by conductors 43 and 45 between the principal electrodes 23 and 25. That potential, however, is not of itself sufficient to produce an electrical discharge through the flash device 21 between the electrodes 23 and 25. The value of the energy subsequently discharged through the tube, however, may be adjusted by varying the tap 41 along the variable series impedance 39.

Upon the insertion of an appropriate coin or coins in the coin slot 11 of FIG. 1, a switch 11' becomes actuated to a closed position. The insertion of the slide-support holder 9 containing the slide 14 to its limiting inward position, not quite shown in FIG. 4, may serve to close a further switch 9'. Since the capacitor 53 is connected in parallel with the capacitor 49, as before stated, though it is in series with the impedance 51 and the primary winding 55 of the transformer T, it, too, becomes charged. Upon the closure of the coin switch 11' and the switch 9', with the transparency 14 appropriately supported in position, an electrical connection is effected from the upper terminal of the capacitor 53 by way of conductor 61, through the closed switches 11' and 9' and by way of conductor 63 to the conductor 45. This, therefore, provides a short-circuit connection across the capacitor 53 and the primary winding 55 of the transformer T, and serves to permit the capacitor 53 to discharge through the primary winding 55 rendering the transformer T effective, therefore, to produce a trigger pulse which is stepped up in the secondary winding 57 and applied between the trigger electrode 27 and the principal electrode 25 of the flash device 25. The normally ineffective flash device 21 is thereby triggered, permitting the potential of the capacitor 49 to discharge through the flash-device between the principal electrodes 23 and 25, thereby to produce a high-intensity flash of momentary illumination. This flash of high-intensity momentary illumination is preferably directed through a diffusing screen 65 and through the transparency 14. The illuminated transparency 14 is focused by the camera lens 67 upon the predetermined portion of the film 2 encompassed by the dotted conical ray-diverging lines shown passing through the lens 67.

One may either control the effective aperture of the lens 67 by means of a diaphragm 69 to which access may be had from the outside, if desired, or, preferably, by controlling the value of the before-mentioned variable potentiometer 39 to produce an intensity of flash appropriate for the particular density of the transparency 14. A shutter could also be provided at 69 to keep stray light out in the event that the light-tight bottom portion of the housing is not used. The shutter may be controlled from the switch 9', 11' or any other synchronizing control, as is well known.

Once the image of the transparency 14 has been flashed upon the predetermined portion of the film 2, the following sequence of events may take place. The reduction in current through the coil 31 of the relay $R_1$ as a result of the discharge of the stored capacitor energy through the flash device 21 causes the armature contact member 71, associated with the relay $R_1$, to drop downward, engaging contact members 73 and 75 and thus permitting current to flow from the alternating current plug 29 along two paths: first, from the bottom plug terminal to the connected contacts 73 and 75 and thence by conductor 77 to further contact members 79 and 81 that are normally connected together by a shorting bar 83 associated with the armature of a further relay $R_2$, and thence by conductor 85 to the terminal 87 of the delivery motor 12'; secondly, from the upper terminal of the plug 29 by conductor 89 and conductor 91 directly to the other terminal 93 of the motor 12'. The motor 12' thus becomes energized, advancing the composite film 2–6 as it rotates, as before described. This type of film is shown provided with aperture means 60 disposed near the pellet 4 and indicating the next successive position to which the film should be advanced and the motor 12' thereupon stopped. A contact member 95 may be provided that is normally urged upward and that, in the absence of an aperture 60 in the film developing paper 6 thereabove, causes its contact member 97 to engage a further contact member 99. The engagement of the contact members 97 and 99 will permit current to flow, also, from the upper terminal of the plug 29 along the before-mentioned conductor 89 through the coil 101 of the relay $R_2$, thence between the engaged contact members 97 and 99 and by way of conductor 103 to conductor 77 and back to the lower terminal of the alternating-current plug 29. The coil 101 of the relay $R_2$ thus receives current. The relay $R_2$ may, however, be of the slow-response type such that the relay does not operate for a predetermined short interval of time after the motor 12' has commenced its operation of drawing the film 2–6 through the squeeze rolls 8 and 10, thus to effect developing and printing while advancing the film to the next successive position for subsequent exposure. Ultimately, however, the relay 101 will act to draw its armature contact members 83 and 83' downward and thus to eengage contact members 81' with 79' and 81 with 79, placing the damping resistor R in parallel with the motor terminals 93 and 87 and commencing the slow-down of the motor 12'. At the same time, a time-delay spring device 101' may become loaded or cocked. At the time that next successive exposure position of the film 2 and the next successive pellet 4 of the film developing and printing paper 6 are reached, an aperture 60 in the film printing paper 6 will pass over the contact member 95 permitting the same to spring upward, as shown in FIG. 4, breaking the engagement between contacts 97 and 99 and de-energizing the relay $R_2$. The charging current, moreover, will have again energized the relay $R_1$, open-circuiting the contacts 73 and 75. The motor 12' is thus stopped at the appropriate position for a subsequent exposure and developing and printing sequence. In this manner, therefore, it is insured that the next successive position of the film 2 is automatically advanced to the place desired for the taking of the next flash photograph.

Figure 2:
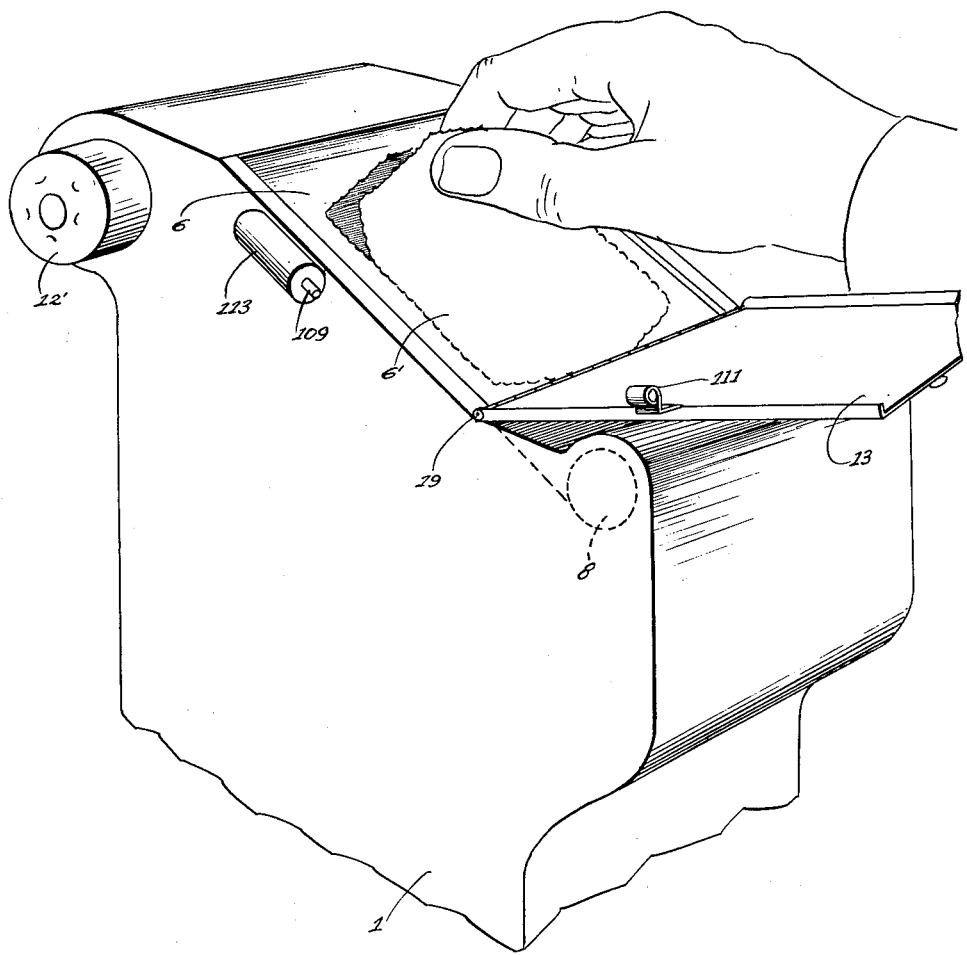
FIG. 2 is a similar fragmentary perspective, drawn upon a somewhat enlarged scale.

In parallel with the terminals of the plug 29 are a pair of further conductors 105 and 107 that establish a circuit through the coil of a further relay $R_3$ the armature 109 of which will be caused to lock within a receiving recess 111 associated with the lid 13 so that the lid 13 can not be opened during the advancement of the film and the developing and printing process. This operation of the armature 109 may load or cock a time-delay device 113, such as a time-delay spring of any conventional type, so that the armature 109 will not open until after the elapse of the developing and printing time. The armature 109 will then withdraw by the release of the time-delay spring device 113, permitting the lid 13 to be opened, as shown in FIG. 2, and the serrated film print 6' to be removed.

Figure 3:
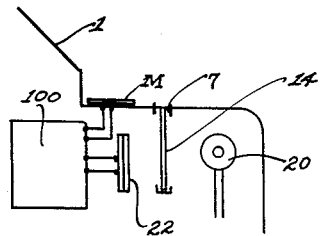
FIGS. 3 and 4 are combination longitudinal sections and schematic circuit diagrams of different portions of the apparatus in FIG. 1.
Figure 5:
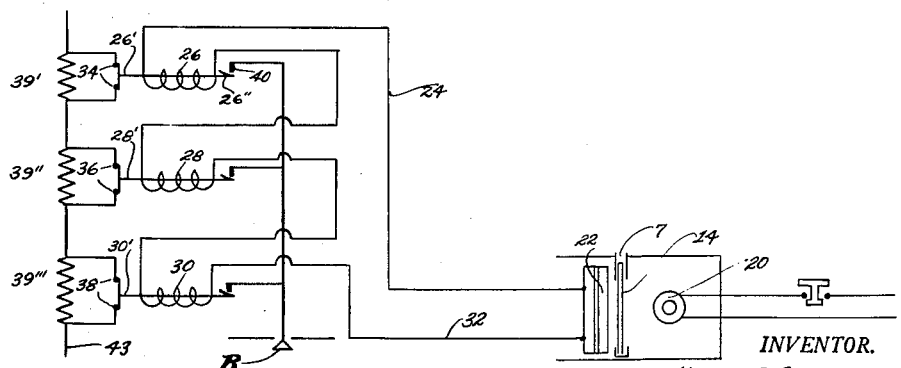
FIG. 5 is a partial schematic diagram of a modification.

If desired, the meter M, with the aid of which a proper flash intensity may be selected for a particular transparency density, may be connected with photo-electric exposure-metering apparatus 100, FIG. 3, of the type disclosed, for example, in my said United States Letters Patent No. 2,588,368, issued March 11, 1952. The photocell 22 may receive light transmitted from a lamp 20 after passing through the transparency 14 inserted within the housing slot 7. Other types of metering systems may also be employed. The user will observe the meter reading and set the knob K, FIG. 1, to a corresponding position. The knob K will, as before stated, control the potentiometer tap 41, thus in accordance with the density of the transparency as monitored by the photo-sensitive exposure meter and indicated on the meter M, adjusting the potential applied to the flash device 21 and the intensity of the light flash. This process may, however, be effected automatically as shown in FIG. 5. The transparency 14 is there shown inserted within the slot 7 of FIG. 1 and, again, as in the system of FIG. 3, the light source 20 is shown passing illumination through the transparency 14 to a photo-sensitive cell or surface 22. The upper terminal of the photo-sensitive surface 22 is connected by conductor 24 through a first relay coil 26, through a second relay coil 28 and thence through a third relay coil 30, back by conductor 32 to the lower terminal of the photo-sensitive device 22. The relay coils 26, 28 and 30 have successively increasing current-operating thresholds. Depending upon the current generated by the photo-sensitive device 22, which is a function of the density of the transparency 14, the first relay coil 26, or the first and second relay coils 26 and 28, or all the relay coils 26, 28 and 30 will receive sufficient energizing current to operate them and move their associated contact armatures 26', 28' and 30', respectively, out of engagement with corresponding pairs of contact members 34, 36 and 38, respectively. The contact members 34, 36 and 38 serve to short-circuit successive portions 39', 39'' and 39''' of the variable impedance or resistor 39 of FIG. 4. Assuming, for example, there is only sufficient photocell current (resulting from a dense transparency 14) to operate the relay 26, but not the relays 28 and 30, only the armature 26 will move to the right, its spring end 26'' locking behind a catch 40. Only the portion 39' of the resistor 39 will thus be in circuit, the resistors 39'' and 39''' being shorted by the contact members 36 and 38 of the respective closed-position armatures 28' and 30'. A high potential will thus be applied between the principal electrodes 23 and 25 of the flash device 21 producing a high-intensity flash for, in this case, the dense transparency 14. The armature 26' may then be released from the catch 40 by depressing the button B. When, however, less dense transparencies 14 are employed so that greater current is generated in the photo-sensitive member 22, the relay 28, or both the relay 28 and the relay 30 may be energized, thus adding the resistor portions 39'', or 39'' and 39''' to the circuit. Less potential will then be applied between the principal electrodes 23 and 25 of the flash device 21 and hence less intense flashes, corresponding to less dense transparencies, will be produced. An automatic control of the flash intensity in accordance with the density of the film transparency is thus provided. If desired, moreover, the automatic circuit of my copending application Serial No. 651,102, filed April 5, 1957, for method of and Apparatus for the Control of Electrical Impulses, may also be employed.

It is also to be understood that where a coin-operated switch 11' is not desired, it may be omitted, or it may be operated by other than the insertion of a coin. By similar token, the insertion of the tray support 9 need not itself actuate the switch 9', but, when the transparency 14 is properly supported upon the tray support 9, the user may merely close the switch 9', or if it is not employed, close the switch 11' or any similar trigger switch.

Further modifications will occur to those skilled in the art and all such are considered to fall within the spirit and scope of the inventtion, as defined in the appended claims.

What is claimed is:

1. Apparatus for photographing a transparency having, in combination, a normally ineffective electric flash device for producing a flash of illumination when effective, the flash device having a pair of principal electrodes and a trigger electrode, a capacitor connected between the principal electrodes, means for charging the capacitor to a potential insufficient to produce a discharge through the flash device between the principal electrodes thereof in the absence of energization of the trigger electrode, means interposed between the capacitor and the principal electrodes for controlling the light energy emitted by the flash device in accordance with the density of the transparency, a camera provided with a lens directed toward the flash device and film-advancing means, means interposed between the flash device and the lens for supporting the transparency, an electric trigger circuit operable for energizing the trigger electrode in order to render the flash device effective to produce a flash of illumination, the lens being adjusted with respect to the camera film and the supporting means to focus the illuminated transparency upon a portion of the film, and means operable after the production of the flash of illumination for operating the film-advancing means to place another portion of the film in position for exposure to a subsequent flash of illumination.

2. Apparatus for photographing a transparency having a substantially illumination-tight housing containing, in combination: a normally ineffective electric flash device for producing a flash of illumination when effective, the flash device having a pair of principal electrodes and a trigger electrode; a capacitor connected between the principal electrodes; means for charging the capacitor to a potential insufficient to produce a discharge through the flash device between the principal electrodes thereof in the absence of energization of the trigger electrode; a camera provided with a lens directed toward the flash device and film-advancing means; means interposed between the flash device and the lens for supporting the transparency; a coin-operated switch; an electric trigger circuit interrupted by the coin-operated switch and a further switch operable when the transparency is so supported for rendering the flash device effective to produce a flash of illumination, the lens being adjusted with respect to the camera film and the supporting means to focus the illuminated transparency upon a portion of the film; means responsive to the rendering effective of the flash device upon the operation of the trigger circuit and operable after the termination of the flash of illumination for operating the film-advancing means, the camera being internally provided with means controlled by and upon the operation of the film-advancing means for developing and printing the said portion of the film exposed to the said flash of illumination; means for permitting the removal of the said developed and printed portion of the film from the camera with the advanced film in position for exposure to a subsequent flash of illumination; and means comprising photo-sensitive means for determining the density of the transparency and means controlled in accordance with the determined density of the transparency for controlling the potential discharged by said capacitor to said principal electrodes when the flash device is effective.

3. Apparatus as claimed in claim 2 and in which the discharge-potential controlling means comprises variable-impedance means disposed in the said connection between said capacitor and the said principal electrodes.

4. Apparatus for photographing a transparency having, in combination: a normally ineffective electric flash device for producing a flash of illumination when effective, the flash device having a pair of principal electrodes and a trigger electrode; a capacitor connected between the principal electrodes; means for charging the capacitor to a potential insufficient to produce a discharge through the flash device between the principal electrodes thereof in the absence of energization of the trigger electrode; a camera provided with a lens directed toward the flash device and film-advancing means; means interposed between the flash device and the lens for supporting the transparency; a substantially illumination-tight housing containing said flash device, said supported transparency and said camera lens; an electric trigger circuit interrupted by a switch operable for rendering the flash device effective to produce a flash of illumination, the lens being adjusted with respect to the camera film and the supporting means to focus the illuminated transparency upon a portion of the film; means responsive to the rendering effective of the flash device upon the operation of the trigger circuit and operable after the termination of the flash of illumination for operating the film-advancing means, the camera being internally provided with means controlled by and upon the operation of the film-advancing means for developing and printing the said portion of the film exposed to the said flash of illumination; means for permitting the removal of the said developed and printed portion of the film from the camera with the advanced film in position for exposure to a subsequent flash of illumination; and means comprising photo-sensitive means for determining the density of the transparency and means controlled in accordance with the determined density of the transparency for controlling the potential discharged by said capacitor to the principal electrodes when the flash device is effective.

5. Apparatus as claimed in claim 4 and in which the removal-permitting means comprises a time-delay latch that unlocks after the elapse of a predetermined interval of time following the advancement of the film that corresponds to the required developing and printing time of the film.

6. Apparatus for photographing a transparency as claimed in claim 4 and in which the means for controlling the potential discharged by said capacitor to said principal electrodes comprises a source of illumination, photo-sensitive means adapted to produce an electric current in proportion to the light energy impinging thereupon, means for disposing the transparency optically intermediate the source and the photo-sensitive means, a plurality of relays each having a coil with different current-operating thresholds and a moveable member subject to being activated when current in excess of the threshold value passes through the coil, a plurality of impedances each of which is associated with one of said relays and adapted to be connected into the circuit between said capacitor and said principal electrodes upon the activization of said moveable member, and means for connecting the photo-sensitive means in series with the plurality of relay coils.

7. Apparatus for photographing a transparency as claimed in claim 4 and in which the means for controlling the potential discharged by said capacitor to said principal electrodes comprises a source of illumination, photo-sensitive means adapted to produce an electric signal in proportion to the light energy impinging thereupon, means for disposing the transparency optically intermediate the source and the photo-sensitive means, means connected to the photo-sensitive means for indicating the electrical signal produced thereby, variable impedance connected in circuit between said capacitor and said principal electrodes, and means controllable in accordance with the indicated signal for adjusting said variable impedance.

8. Apparatus for photographing a transparency having, in combination: a normally ineffective electric flash device for producing a flash of illumination when effective, the flash device having a pair of principal electrodes and a trigger electrode; a capacitor connected between the principal electrodes; means for charging the capacitor to a potential insufficient to produce a discharge through the flash device between the principal electrodes thereof in the absence of energization of the trigger electrode; a camera provided with a lens directed toward the flash device and film-advancing means; means interposed between the flash device and the lens for supporting the transparency; a substantially illumination-tight housing containing said flash device, said supported transparency and said camera lens; an electric trigger circuit interrupted by a switch operable when the transparency is so supported for rendering the flash device effective to produce a flash of illumination, the lens being adjusted with respect to the camera film and the supporting means to focus the illuminated transparency upon a portion of the film; means responsive to the rendering effective of the flash device upon the operation of the trigger circuit and operable after the termination of the flash of illumination for operating the film-advancing means, the camera being internally provided with means controlled by and upon the operation of the film-advancing means for developing and printing the said portion of the film exposed to the said flash of illumination; means for permitting the removal of the said developed and printed portion of the film from the camera with the advanced film in position for exposure to a subsequent flash of illumination; and means comprising photo-sensitive means for determining the density of the transparency and means controlled in accordance with the determined density of the transparency for controlling the potential discharged by said capacitor to the principal electrodes when the flash device is effective.

9. Apparatus for photographing a transparency having a substantially illumination-tight housing containing, in combination: a normally ineffective electric flash device for producing a flash of illumination when effective, the flash device having a pair of principal electrodes and a trigger electrode; a capacitor connected between the principal electrodes; means for charging the capacitor to a potential insufficient to produce a discharge through the flash device between the principal electrodes thereof in the absence of energization of the trigger electrode; a camera provided with a lens directed toward the flash device and film-advancing means; means interposed between the flash device and the lens for supporting the transparency; an electric trigger circuit interrupted by a switch operable when the transparency is so supported for rendering the flash device effective to produce a flash of illumination, the lens being adjusted with respect to the camera film and the supporting means to focus the illuminated transparency upon a portion of the film; means responsive to the rendering effective of the flash device upon the operation of the trigger circuit and operable after the termination of the flash of illumination for operating the film-advancing means, the camera being internally provided with means controlled by and upon the operation of the film-advancing means for developing and printing the said portion of the film exposed to the said flash of illumination; means for permitting the removal of the said developed and printed portion of the film from the camera with the advanced film in position for exposure to a subsequent flash of illumination; and means comprising photo-sensitive means for determining the density of the transparency and means controlled in accordance with the determined density of the transparency for controlling the potential discharged by said capacitor to said principal electrodes when the flash device is effective.

References Cited in the file of this patent

UNITED STATES PATENTS

| | | |
|---|---|---|
| 2,139,703 | Taylor | Dec. 13, 1938 |
| 2,192,755 | Rabkin et al. | May 5, 1940 |
| 2,293,425 | Dammond | Aug. 18, 1942 |
| 2,516,398 | Land et al. | July 25, 1950 |
| 2,552,251 | Bornemann | May 8, 1951 |
| 2,582,001 | Bornemann et al. | Jan. 8, 1952 |
| 2,605,447 | Troup | July 29, 1952 |
| 2,664,038 | Canham | Dec. 29, 1953 |
| 2,699,100 | Simjian | Jan. 11, 1955 |
| 2,741,961 | Anton | Apr. 17, 1956 |
| 2,751,814 | Limberger | June 26, 1956 |
| 2,778,269 | Bartlett | Jan. 22, 1957 |
| 2,840,214 | Doud | June 24, 1958 |
| 2,895,378 | Budde | July 21, 1959 |

FOREIGN PATENTS

| | | |
|---|---|---|
| 314,627 | Great Britain | July 4, 1929 |
| 568,840 | Great Britain | Apr. 23, 1945 |